(No Model.) 2 Sheets—Sheet 2.
H. HOCHSTRATE.
Ore Separator.
No. 235,770. Patented Dec. 21, 1880.
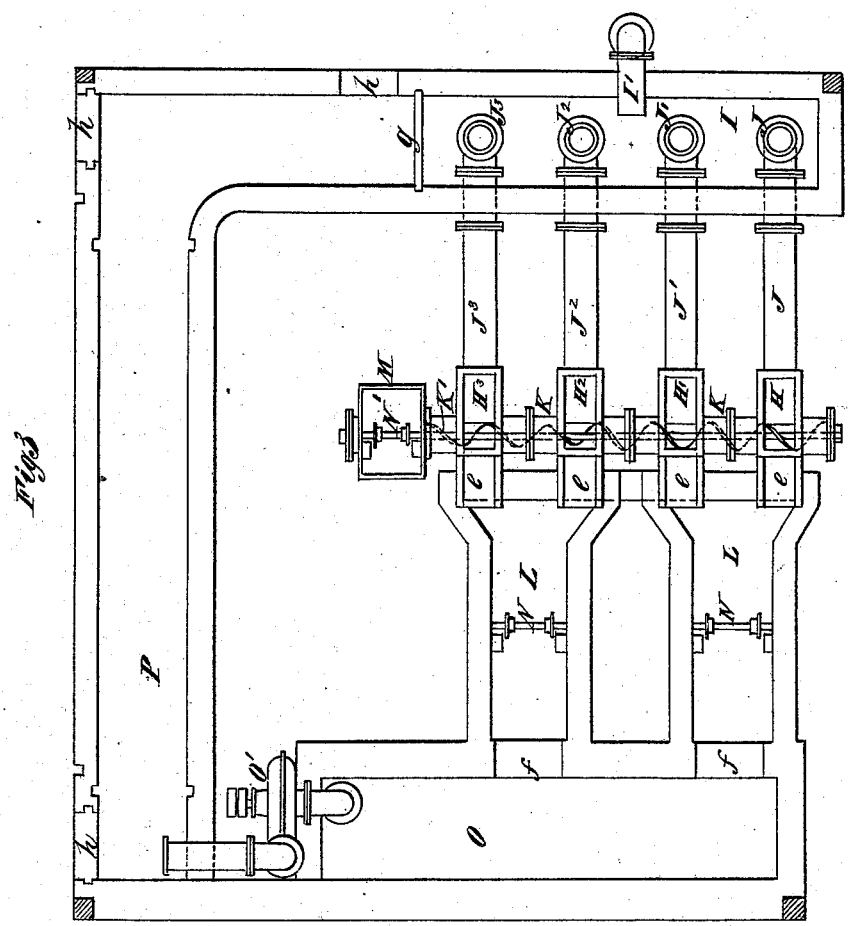
Witnesses
John Becker
Fredk Haynes
Inventor
Henrich Hochstrate
by his Attorney

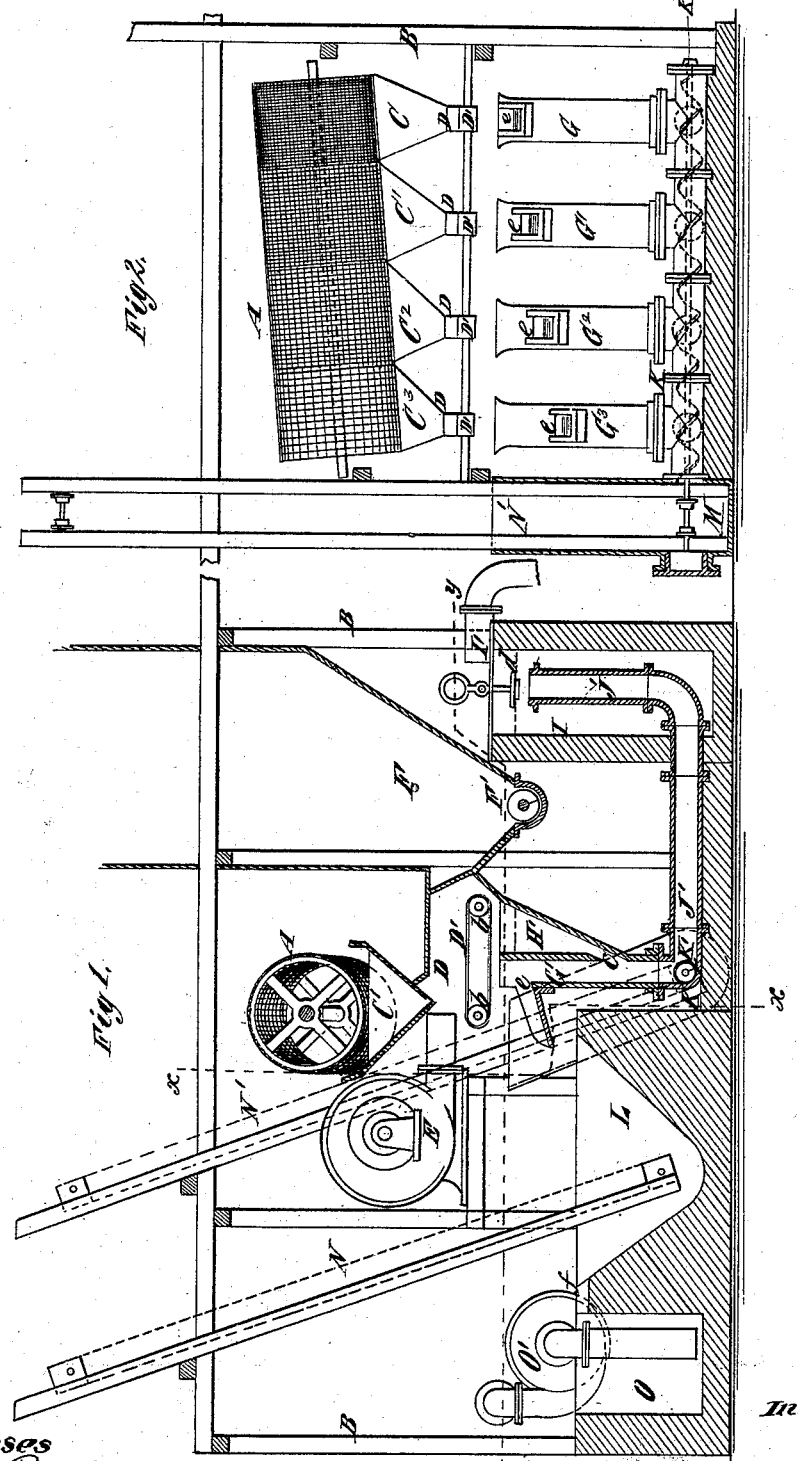

UNITED STATES PATENT OFFICE.

HEINRICH HOCHSTRATE, OF ZECHE RHEINPREUSSEN AT HOMBERG-ON-THE-RHINE, GERMANY.

ORE-SEPARATOR.

SPECIFICATION forming part of Letters Patent No. 235,770, dated December 21, 1880.

Application filed August 5, 1880. (No model.)

*To all whom it may concern:*

Be it known that I, HEINRICH HOCHSTRATE, of Zeche Rheinpreussen, Homberg-on-the-Rhine, in the Empire of Germany, have invented certain new and useful Improvements in Apparatus for Washing and Separating Ores, of which the following is a specification.

My invention consists in a machine for washing and separating ores, comprising a screen or sieve composed of perforated or reticulated material, portions of which are of different degrees of fineness, into which the material to be separated is placed, and from which it is delivered to hoppers or vessels, to which water is continuously supplied at the bottom, and which are provided with overflows for carrying off the water and all light material, and a conveyer at the bottom for carrying off the heavy material, which sinks through the water. When delivered from the screen or sieve the ore preferably passes into hoppers, from which it falls onto a horizontal, or nearly horizontal, apron or belt having a continuous forward motion, and by which it is delivered to the water hoppers or vessels. The aprons or belts are arranged in chambers or passages, through which currents or blasts of air are passed to carry off light and refuse matters.

The invention also consists in various details of construction, to be hereinafter described and claimed.

In the accompanying drawings, Figure 1 represents a vertical section through a machine embodying my invention. Fig. 2 represents a section upon the dotted line $x x$, Fig. 1, and Fig. 3 represents a horizontal section upon the dotted line $y y$, Fig. 1.

Similar letters of reference designate corresponding parts in all the figures.

A designates a screen or sieve composed of perforated or reticulated material and adapted to be rotated in bearings in a frame-work, B. The screen or sieve is represented as arranged at an incline, so that material introduced into its higher end will be carried by its rotation gradually toward the lower end. The surface of the screen or sieve is here shown as composed of four portions of different degrees of fineness, that at the higher end being the finest, while that at the lowest end is the coarsest. From the four portions of the screen or sieve the material is delivered into hoppers $C$ $C'$ $C^2$ $C^3$, from whence it passes into four channels or passages, D, extending in an approximately horizontal direction.

E designates blowers, which force continuous blasts or currents of air through these channels or chambers, thereby carrying away all dust and light dirt into a dust-chamber, F, from which the accumulation of dust and dirt is carried away by a screw-conveyer, F'. The material, as it falls from each hopper, is deposited upon an apron or belt, D', mounted upon pulleys $b$, and having a continuous forward motion imparted to it by any suitable means in the direction of the currents produced by the blowers E.

The arrangement of the screen or sieve, the blowers, the passages or channels, the dust-chamber, and the aprons or belts is the same as that shown in Letters Patent of the United States granted to me March 18, 1879, and numbered 213,421.

$G$ $G'$ $G^2$ $G^3$ designate four upright pipes or vessels, arranged below the aprons or belts D', and having hoppers $H$ $H'$ $H^2$ $H^3$ communicating with them by means of openings $c$, and into which the material is deposited from the aprons or belts D'.

I designates a tank or vessel, supplied with fresh water by a pipe, I'; and $J$ $J'$ $J^2$ $J^3$ designate pipes leading from the tank or vessel I, and communicating with the pipes or vessels $G$ $G'$ $G^2$ $G^3$. The several pipes $J$ $J'$ $J^2$ $J^3$ are turned up at their ends, and are provided with valves $d$, by which the flow of water through them may be regulated. The several upright pipes or vessels $G$ $G'$ $G^2$ $G^3$ communicate at their lower ends with a horizontal pipe, K, in which is a screw-conveyer, K', and each of said upright pipes or vessels is provided with an overflow, $e$, the overflows of the several pipes being arranged at different levels, as shown in Fig. 2. The water passes continuously from the tank I through the several pipes $J$ $J'$ $J^2$ $J^3$ to the upright pipes or vessels $G$ $G'$ $G^2$ $G^3$, and flows over the several overflows $e$.

Although four upright pipes or vessels and four inlet-pipes are here shown, the number may be increased or diminished to suit the number of grades of ore separated by the screen or sieve.

The light and heavy ore, after being deposited in the hoppers H H' H² H³, passes through the openings c, and all light material is carried up by the water and passes over the overflows e into two vats or vessels, L, while the heavy material sinks through the water and falls to the bottom of the pipes or vessels G G' G² G³, whence it is carried off by the conveyer K' to a box or tank, M. From the vats or tanks L the lighter material is carried upward by conveyers or elevators N, and from the box or tank M by a conveyer or elevator, N'.

It is obvious that the flow of water through the vessels or pipes G G' G² G³ varies in proportion as the overflows e are below the level of the water in the tank I.

From the vats or tanks L the water passes, by overflows f, to the tank O, from which it is raised by a pump, O', or other means, and deposited in a clearing or settling tank, P, where all the lighter impurities carried over with the water settle, and leave the water free from dirt or impurities and fit for further use. The water in the clearing or settling tank P is intended to stand at the same level as the water in the fresh-water tank I, and hence, if sufficient water is not supplied by the pipe I', the water flows from the settling or clearing tank into the tank I through a grating, g, by which impurities are prevented from passing with the water to the tank I. The settling or clearing tank is furnished with overflows h, by which the surplus water may escape.

The buckets of the conveyers or elevators N N' are preferably perforated, so that all the water will drain from the ore as it is raised, and the ore be deposited at an upper level in a comparatively dry state.

What I claim as my invention, and desire to secure by Letters Patent, is—

1. The combination, in a machine for washing and separating ore, of a screen or sieve for separating ore of different sizes, upright pipes or vessels, each provided with a water-inlet at the bottom and an overflow near the top, a conveyer with which the lower ends of said upright pipes or vessels communicate, and hoppers into which the ore is delivered from the screen or sieve and which communicate with the said upright pipes or vessels below the overflows thereof, substantially as and for the purpose specified.

2. The combination of the screen or sieve A, the upright pipes or vessels G G' G² G³, provided with overflows at different heights, the hoppers H H' H² H³, communicating with said upright pipes or vessels, the supply-pipes J J' J² J³, the tank I, and the conveyer K', all substantially as specified.

3. The combination, in a machine for separating ore, with the screen or sieve A, of the hoppers C C' C² C³, the passages or channels D, means for producing a blast or current of air through said passages or channels, the aprons or belts D', upright pipes or vessels, each having an overflow near the top and a water-inlet near the bottom, a conveyer below said upright pipes or vessels, and hoppers into which the material is delivered by the said aprons or belts and which communicate with said upright pipes or vessels below their overflows, subtantially as and for the purpose specified.

4. The combination of the upright pipes or passages G G' G² G³, having overflows e, the tank I, the inlet-pipes J J' J² J³, the conveyer K', the tank L, the tank O, the pump O', and the settling or clearing tank P, all substantially as specified.

In testimony whereof I have signed my name to this specification in the presence of two subscribing witnesses.

HEINRICH HOCHSTRATE.

Witnesses:
AUGT. SIEDENBERG,
L. BECKER.